Figure 1:
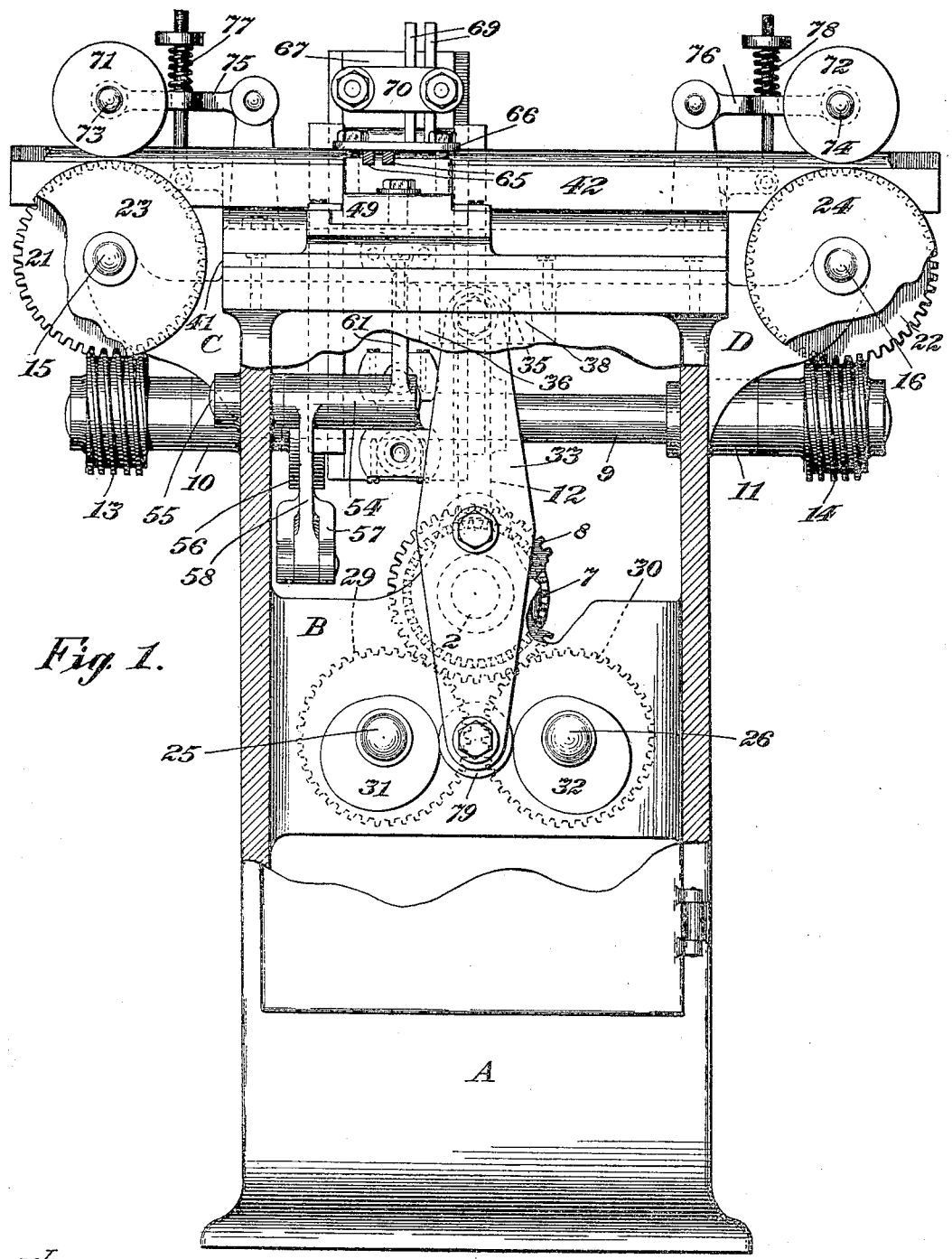

No. 808,478. PATENTED DEC. 26, 1905.
F. H. RICHARDS.
CARVING MACHINE.
APPLICATION FILED MAY 12, 1902.

6 SHEETS—SHEET 5.

Witnesses:
F. G. Hachenberg.
O. C. Abbott

Inventor.
F. H. Richards.

No. 808,478.  PATENTED DEC. 26, 1905.
F. H. RICHARDS.
CARVING MACHINE.
APPLICATION FILED MAY 12, 1902.
6 SHEETS—SHEET 6.
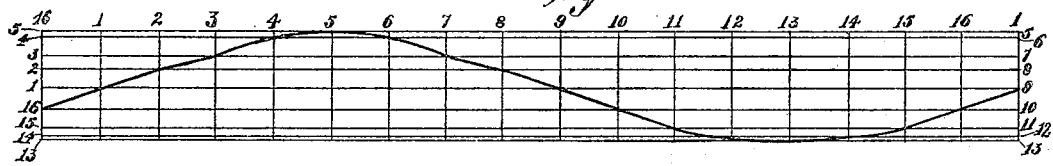
Horizontal tool movement. Fig. 12.
Vertical tool movement. Fig. 13.
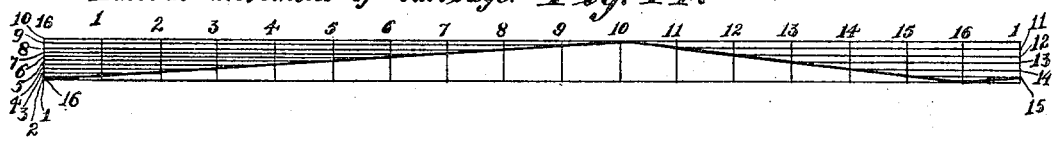
Lateral movement of carriage. Fig. 14.
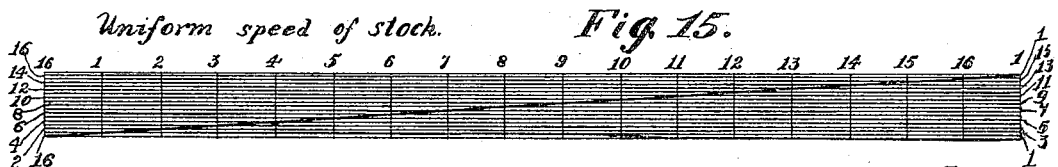
Uniform speed of stock. Fig. 15.
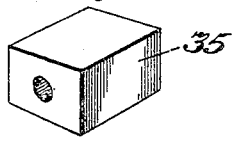
Fig. 16.
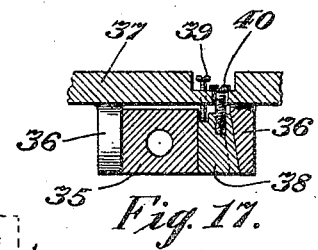
Fig. 17.
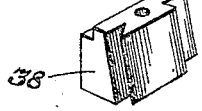
Fig. 18.
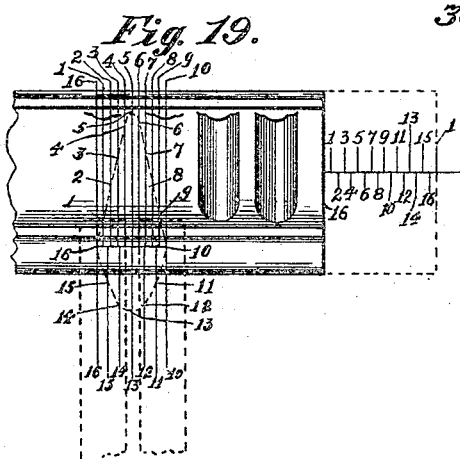
Fig. 19.
Witnesses:
F. G. Hachenberg.
A. C. Abbott
Inventor:
F. H. Richards.

UNITED STATES PATENT OFFICE.

FRANCIS H. RICHARDS, OF HARTFORD, CONNECTICUT.

CARVING-MACHINE.

No. 808,478.       Specification of Letters Patent.       Patented Dec. 26, 1905.

Application filed May 12, 1902. Serial No. 107,023.

*To all whom it may concern:*

Be it known that I, FRANCIS H. RICHARDS, a citizen of the United States, residing at Hartford, in the county of Hartford and State of Connecticut, have invented certain new and useful Improvements in Carving-Machines, of which the following is a specification.

The present invention relates to machines for carving repeat ornaments on wood, moldings, or the like.

This invention more particularly concerns the organization of a machine of the above characterized type so constituted as to admit of the continuous operation of the machine upon continuously-fed stock and to certain novel constructions, combinations, and arrangements of parts hereinafter particularly set forth and claimed.

Some of the objects of my invention are to provide a simple, practical, and efficient machine for carving moldings and the like, to provide a machine wherein the stock is continuously fed to the carving mechanism, and to provide such continuous-feed carving-machine as will be commercially efficient and productive of a large output, and to provide an organization particularly adapted to withstand the usage to which a machine of this class is put in every-day practice.

To these ends my invention consists in the novel arrangement and combination of parts hereinafter described, and pointed out in the claims.

I have illustrated one embodiment of my invention in a carving-machine in the accompanying drawings, in which like reference characters refer to like parts throughout the several views.

Figure 2:
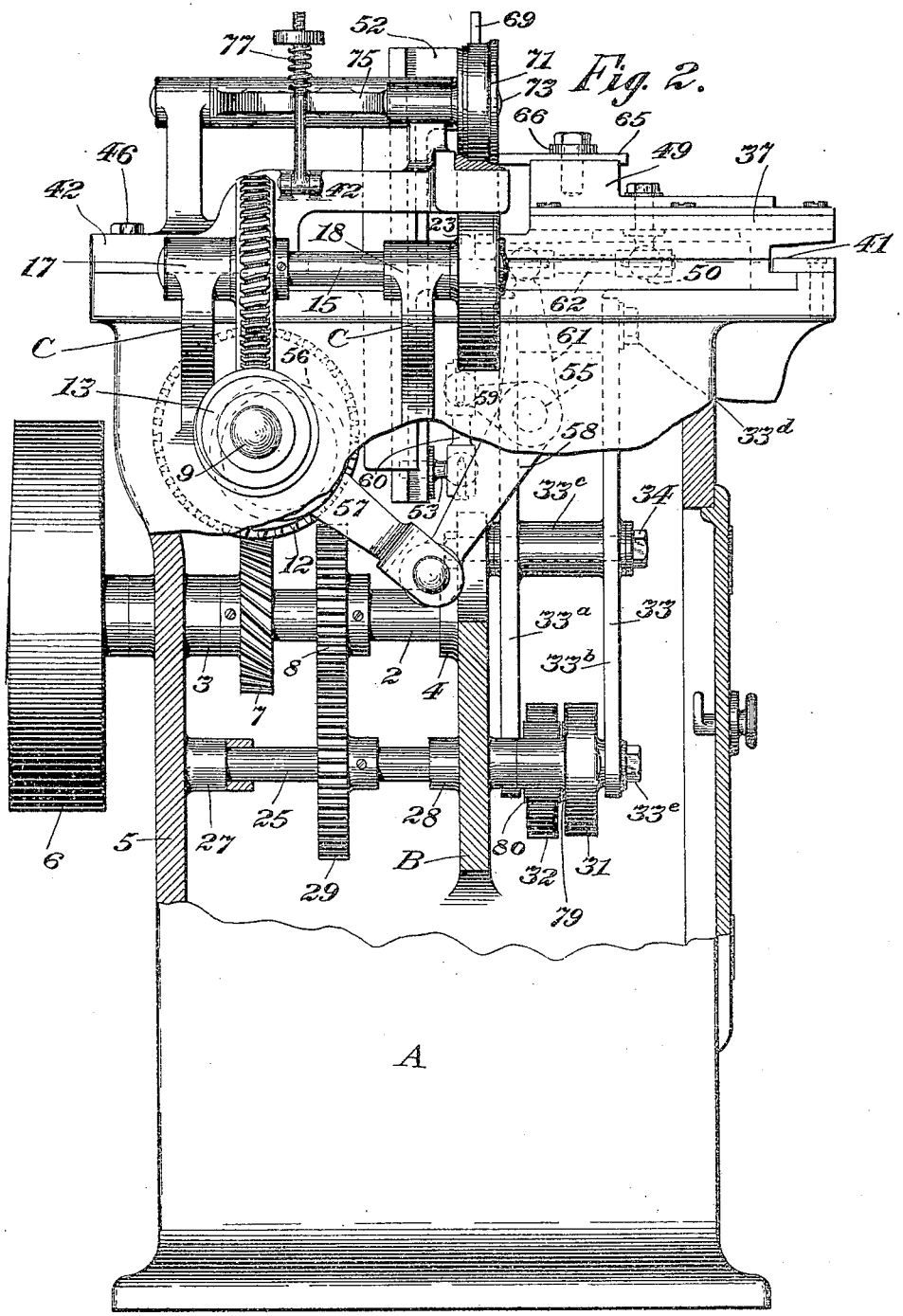
Figure 3:
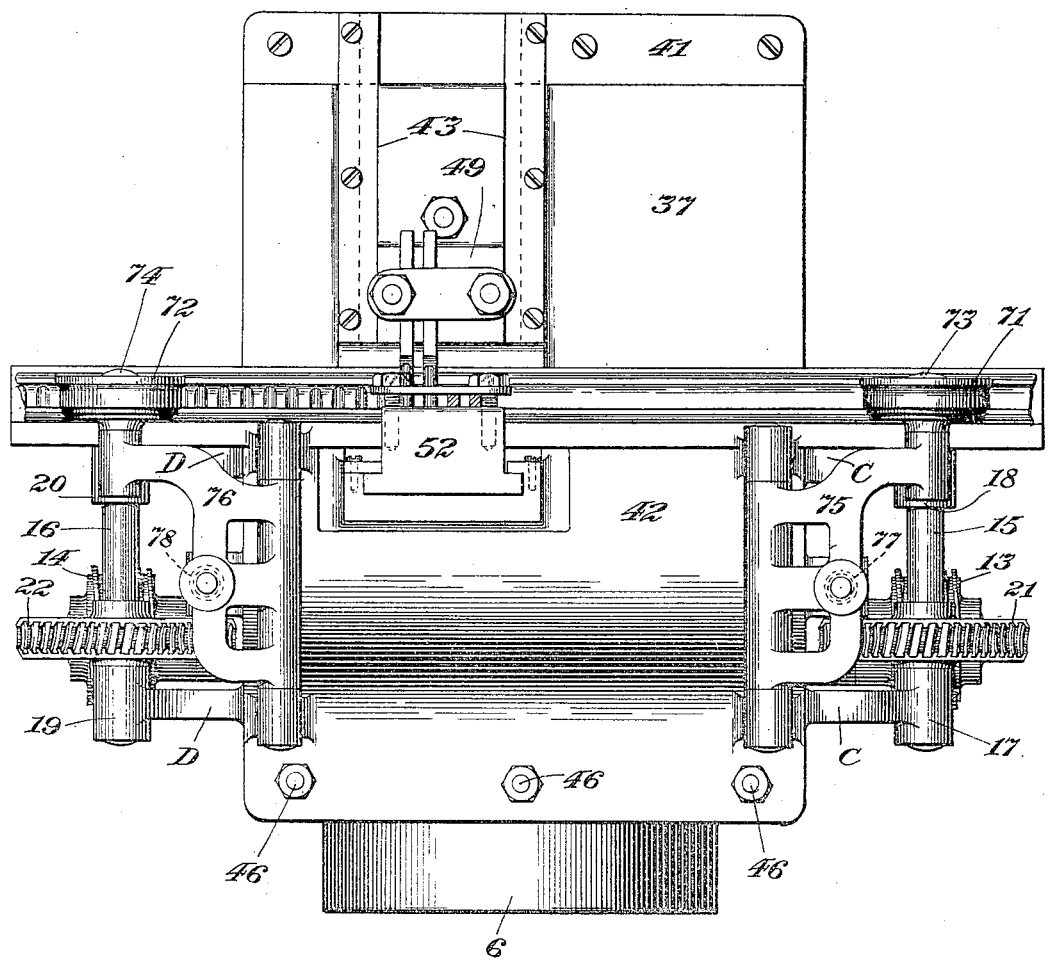
Figure 4:
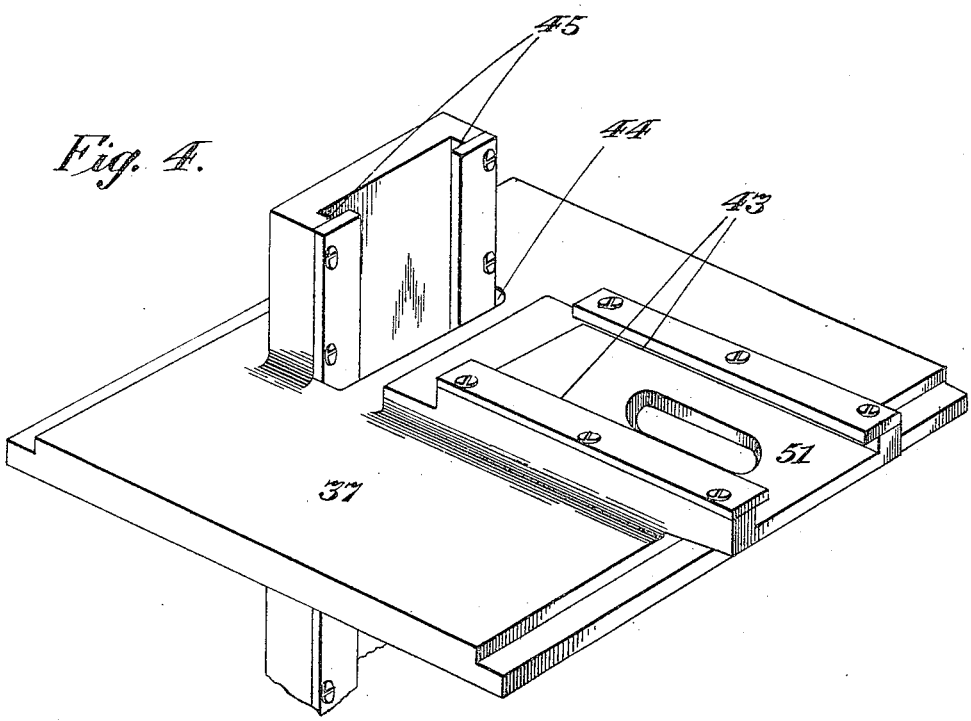
Figure 5:
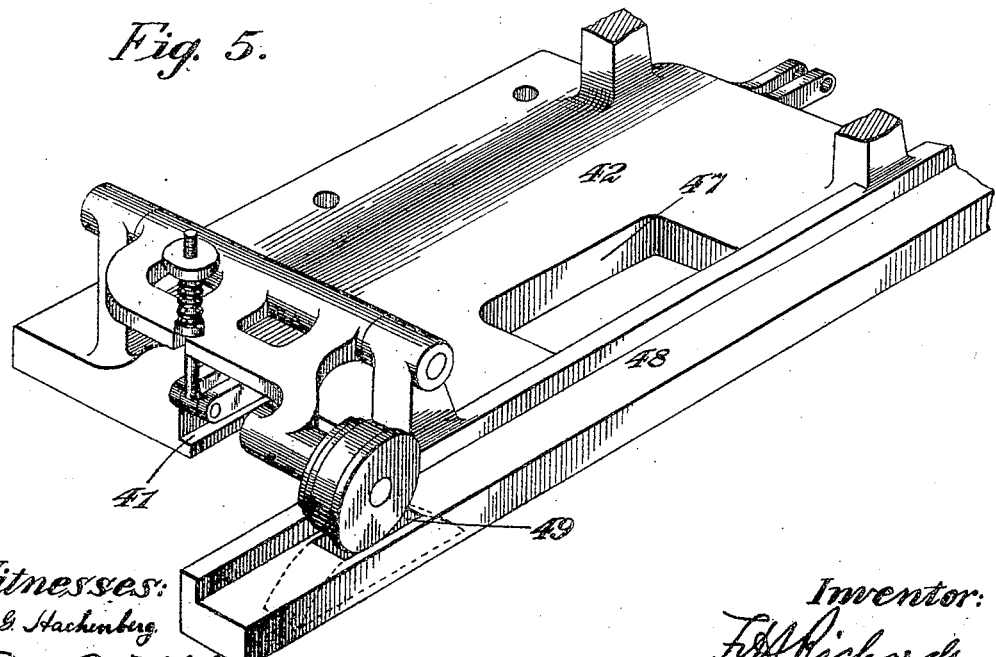
Figure 6:
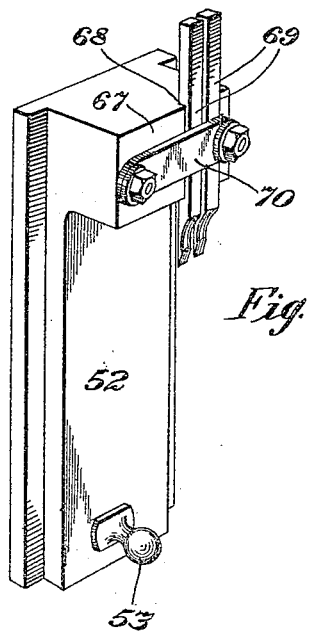
Figure 7:
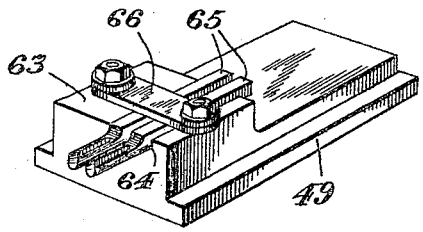
Figure 8:
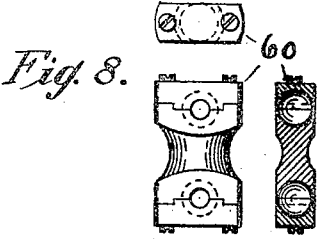
Figure 9:
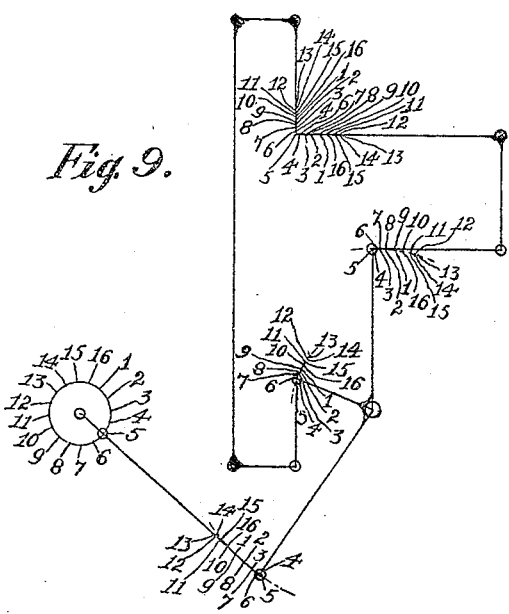
Figure 10:
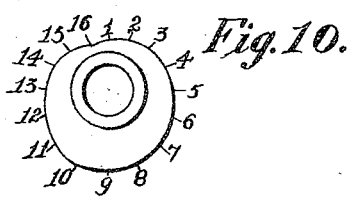
Figure 11:
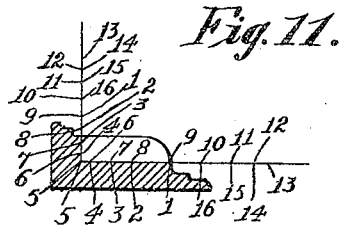

Figure 1 is a left side elevation showing side wall broken away; Fig. 2, a rear elevation showing rear wall broken away; Fig. 3, a plan view; Fig. 4, a detail in perspective of the carrier; Fig. 5, a detail in perspective of the overhang plate; Fig. 6, a detail in perspective of the vertically-movable carriage; Fig. 7, a detail in perspective of the horizontally-movable carriage; Fig. 8, end, side, and section details of a link; Fig. 9, a diagrammatic view of the cutter-actuating mechanism; Fig. 10, a detail of a cam; Fig. 11, a diagrammatic section of the stock, showing sixteen successive positions assumed by the tool; Figs. 12, 13, 14, and 15, time-charts, showing the curves of movement of the several parts indicated thereon; Fig. 16, a detail of a sliding bearing-block; Fig. 17, a detail section of the sliding connection between the carrier and the rocking beam; Fig. 18, a detail of a wedge-gib, and Fig. 19 a diagram of the movements of the stock and tool.

Referring to the drawings, the machine is mounted and assembled on a box-like frame A, which is interiorly provided with a vertical partition V, extending across from wall to wall, but not reaching to the top or bottom of the frame A. A driving-shaft 2 is horizontally mounted in bearings 3 and 4, respectively, in one side wall 5 of the frame A and the partition B. The shaft 2 extends through the bearing 3 and without the frame A and is provided upon its projecting portion with a fast driving-pulley 6. The shaft 2, within the frame A and between the wall 5 and partition V, carries a fast spiral gear 7 and a fast spur-gear 8. The shaft 2 is restricted against longitudinal movement by the abutment of the hubs of pulley 6 and spiral gear 7 with each side of the bearing 3.

Directly above the spiral gear 7 on shaft 2 a shaft 9 is horizontally mounted transversely of the shaft 2 in bearings 10 and 11 in the end walls of the frame A. A spiral gear 12, fast on shaft 9, meshes with and is driven from spiral gear 7 on shaft 2. The shaft 9 projects through its bearings 10 and 11 and without the frame A at each end and on its projecting portions is provided with fast worms 13 and 14. Directly above the worms 13 and 14 shafts 15 and 16 are respectively horizontally mounted transversely of the shaft 9, the shaft 15 in bearings 17 and 18 in extensions C C of the frame A, and the shaft 16 in bearings 19 and 20 in extensions D D of the frame A. Worm-wheels 21 and 22 are respectively mounted fast on shafts 15 and 16 and respectively mesh with and are driven by the worms 13 and 14. Shaft 15 projects through and beyond its bearings 18 and is provided upon its projecting portion with a fast feed-roll 23. Shaft 16 projects through and beyond its bearing 20 and is provided upon its projecting portion with a fast feed-roll 24. The worms 13 and 14 are both right hand, so that the feed-rolls 23 and 24 both rotate in the same direction. In the machine illustrated the ratio of revolution between the worms 13 and 14 and the worm-wheels 21 and 22 is as twenty-four to one and as the shaft 9 is geared one to one with the drive-shaft 2 the feed-rolls 23 and 24 make one revolution in the same direction to one revolution of the drive-shaft 2.

Two shafts 25 and 26 are mounted parallel with and to either side of the shaft 2 in a horizontal plane of mounting, the shaft 25 in a bearing 27 in the wall 5 and a bearing 28 in the partition B, and the shaft 26 in similar bearing in the wall 5 and partition B. A spur-gear 29 is mounted fast on shaft 25 and meshes with and is driven by gear 8 on shaft 2. A spur-gear 30 is mounted fast on shaft 26 and meshes with and is driven by gear 8 on shaft 2 in the same direction as that of gear 29. The shafts 25 and 26 project through and without their bearings in the partition B. The shaft 25 carries on its projecting portion a peripheral cam 31, and the shaft 26 carries on its projecting portion a peripheral cam 32. Said cams 31 and 32, however, are not set opposite one another on said projecting portions of shafts 25 and 26, but in different planes of rotation.

A rocking beam 33, consisting of two plates 33$^a$ and 33$^b$, connected in their central portions by a hub 33$^c$ and at their ends by spindles 33$^d$ and 33$^e$, is oscillatably mounted through its hub 33$^c$ on a stud 34, mounted on the partition B. The spindle 33$^d$ in the upper end of the rocking beam 33 carries a box 35, (shown in detail in Fig. 16,) which slides in guides 36, depending from the under side of a carrier 37. (See Fig. 17.) One of the guides is provided with a wedge-gib 38. (Shown in detail in Fig. 18.) The wedge-gib 38 is provided to adjust the guides 36 to take up wear and is adjustable by means of two screws 39 and 40, the screw 39 threaded in the carrier 37 and abutting the gib to prevent a rising movement and the screw 40 threaded in the gib and engaging the carrier 37 with its flanged head about a slot through which it passes to prevent a falling movement in the gib. The simultaneous setting of the screws secures the gib.

The carrier 37 is reciprocatably mounted in horizontal guides 41 on the top of the frame A and on an overhang plate 42 parallel with the plane of oscillation of the rocking beam 33. The depending guides 36 and the box 35 vertically slidable therein form an operative connection between the upper end of the rocking beam 33 and the carrier 37, which provides for the arcal movement of the beam 33 and admits of a direct reciprocating movement of the carrier 37.

Two loose rollers 79 and 80 are mounted on the spindle 33$^e$, at the lower end of the rocking beam 33 and respectively travel upon the surfaces of peripheral cams 31 and 32. The peripheral cams 31 and 32 are complementary and are designed to rock the rocking beam 33 to and fro, so that the reciprocating motion imparted by said beam 33 to the carrier 37 will be uniform in the direction of the feed of feed-rolls 23 and 24 and correspond exactly with the speed of stock fed by said rolls occupying, for instance, a period equal in duration to five-eighths of one revolution of the shafts 25 and 26, while the return movement of the carrier 37 will take place in three-eighths of said revolution.

The carrier 37 is provided upon its upper surface with transverse horizontal guideways 43, which extend partially across its face. An aperture 44 through the carrier 37 is provided directly in line with the guideways 43, and vertical guideways 45 are disposed in said aperture projecting above and below said carrier.

The overhang plate 42 is rigidly secured to the frame A by machine-screws 46 and overhangs the carrier 37. An aperture 47 is provided in the overhanging portion of overhang plate 42, through which the guideways 45 project, and said aperture is of a length sufficient to allow of the play of the guideways 45 when the carrier 37 is reciprocated.

A stock-guide 48 is provided in the overhanging edge of the overhang plate 42 parallel with the plane of reciprocation of the carrier 37 and in the plane of rotation of the feed-rolls 23 and 24. The feed-rolls 23 and 24 project through orifices 49 in the stock-guide 48 and slightly above the floor of said stock-guide.

It will now be seen that the carrier 37 reciprocates parallelly of the stock-guide 48, moving in the direction of the feed along said stock-guide during five-eighths of one revolution of the driving-shaft at a uniform speed corresponding to that of said feed and returning during three-eighths of a revolution of the driving-shaft.

A tool-carriage 49 is slidably mounted in the guideways 43 and has a depending lug 50, which extends downwardly through an elongated aperture 51 in the carriage 37. The elongated aperture 51 allows of the free movement of the lug 50 during the reciprocation of the carriage 49. A tool-carriage 52 is slidably mounted in the guideways 45 and has a laterally-projecting lug 53.

A three-armed angle-lever 54 is pivoted upon a stud 55, projecting from one wall of the frame A. An eccentric 56 is mounted fast on the shaft 9 and is connected by an eccentric rod 57 with one arm 58 of the three-armed angle-lever 54 and rocks said angle-lever upon the rotation of shaft 9. The eccentric 56 is preferred in the described construction; but a crank may be used in place thereof and where in the claims the term "crank" is used it is desired that the same be construed to apply to both a crank proper or a modified form of crank, such as an eccentric. A second arm 59 of the angle-lever 54 is connected by a link 60 to the lug 53 on tool-carriage 52, the articulation of said link with said arm 59 and said lug 53 consisting of universal joints, illustrated preferably as ball-and-socket joints. The remaining arm 61 of the angle-lever 54 is connected by a link 62 to the lug 50 on tool-carriage 49, the articulation of said link 62 with said arm 61 and said lug 50 also consisting of universal joints, illustrated preferably as ball-and-socket joints. The construction of the links 60 and 62 is illustrated in Fig. 8, in which end face and section views of a link are shown.

The three-armed angle-lever 54 is rocked by the eccentric 56 and effects a reciprocating motion of the tool-carriages 49 and 52 in the guideways 43 and 45. The links 60 and 62 allow for the continuously-varying distances of the arms from the plane of reciprocation of the carriages due to the arcal movement of the connections on the arms, and the universal articulation of said links also allows of the lateral movement of the carriages by the movement of the carrier 37 to a limited extent.

It will be noted that the movement required of the carriage 52 is much less than that required of the carriage 49, and I therefore proportion the lengths of the respective arms actuating said carriages in accordance with the length of reciprocating stroke to be given each carriage.

The position of the pivot-point of the three-armed lever 54—i. e., the stud 55—should be especially noted in connection with the proportionment of the arms of said lever as said pivot-point is positioned to bring the connecting-points of said arms in approximate alinement with the plane of reciprocation of the connecting-point of the links on the carriages at or near the median point in the arcal movement of said arms.

The tool-carriage 49 is provided with a tool-bed 63, preferably formed with tool-seats 64, in which tools 65 are adapted to lie and be clamped in position by a tool-clamp 66, secured to said bed or in any other suitable manner, as will be determined by the nature of the work to be done and the particular exigencies of the design of a characteristic machine. The tools 65 are directed toward the stock-guide and in a plane parallel to the plane of reciprocation of the carriage. The tool-carriage 52 is also provided with a tool-bed 67, in which are preferably formed tool-seats 68, in which tools 69 are adapted to lie and be clamped in position by a tool-clamp 70 or other means. The tools 69 are directed toward the stock-guide in a plane parallel to the plane of reciprocation of the carriage. The carriages are moved toward the stock-guide simultaneously by the actuating mechanism, and it will be seen that if the tools were set oppositely upon the carriages that when simultaneously carried toward one another to chip out an ornament upon a piece of stock cleanly their cutting edges would meet. Therefore I do not set them oppositely, but in such a manner that the tools upon one carriage will chip out an ornament already incised in the preceding or a preceding operation of the carriages by the tools upon the other carriage, thereby avoiding the meeting of the cutting edges of the tools while the simultaneous action thereof is retained. The eccentric 56 is set upon the shaft 9 and turned so that the movements of the carriages toward the stock-guide will commence and end simultaneously or approximately with the commencement and ending of the movement of the carrier 37 in the direction of movement of the stock, so that the carriages will be traveling in fixed relation to the stock while the tools are incising the stock. The carrier and carriages cover at all times the openings in the frame through which their actuating connections pass, and those portions of the mechanism susceptible to injury or deterioration from contact with the dust and shavings usually present in the environment of a machine of this character are entirely inclosed and protected in the frame A.

Two presser-rolls 71 and 72 are mounted upon spindles 73 and 74, respectively, carried on frames 75 and 76, pivoted on the overhang plate 42. The frames 75 and 76 are tended downwardly by springs 77 and 78, causing the rolls 71 and 72 to press upon the stock lying in the stock-guide directly above the feed-rolls to insure a grip upon said stock by said feed-rolls.

I have shown the preferred arrangement of the parts in the embodiment illustrated, and in referring to the movement of the cutters I wish to point out that the commencement of the movement of the carrier and establishment of momentum therein before the tools engage the stock to incise the same is very advantageous in the creation of a practical machine, and I therefore have devised mechanism for accomplishing such a result and have shown one embodiment thereof; but the essence of my invention is capable of embodiment in various ways and in various forms to suit the requirements of diverse demands.

Many changes and proportionments may be made in the details of construction, organization, and operation of embodiments of my invention without departing from the spirit thereof.

Sixteen successive positions of the cutter-operating elements are indicated by the numerals 1 to 16 in Fig. 9, and said figure will be readily understood taken in connection with Fig. 2.

The feature herein illustrated of knives reciprocated in transverse or intersecting planes is claimed in my copending application, Serial No. 115,920, filed July 17, 1902, and the feature of the knives traveling coincidentally with the stock-feed during the cutting movement is claimed in my copending application, Serial No. 98,948, filed March 19, 1902.

Having described my invention, I claim—

1. In a carving-machine, the combination of a reciprocatable carrier and a plurality of cutters mounted on said carrier and reciprocatable thereon in intersecting planes toward and from the line of intersection of said planes, said planes being parallel to the line of reciprocation of said carrier.

2. In a carving-machine, the combination of a reciprocatable carrier and a plurality of cutters mounted on said carrier and simultaneously reciprocatable thereon in intersecting planes toward and from the line of intersection of said planes, said planes being parallel to the line of reciprocation of said carrier.

3. In a carving-machine, the combination of a reciprocatable carrier, a plurality of cutters mounted on said carrier and reciprocatable thereon in intersecting planes parallel to the line of reciprocation of said carrier, and a driven actuator operatively connected with said cutters to simultaneously reciprocate the same toward and from the line of intersection of said planes.

4. In a carving-machine, the combination of a reciprocatable carrier, a driving-shaft, operative connecting mechanism between said driving-shaft and carrier to impart a reciprocating movement of uniform velocity in one direction to said carrier, a plurality of cutters mounted on said carrier and reciprocatable thereon in intersecting planes parallel to the line of reciprocation of said carrier, and operative connecting mechanism between said driving-shaft and cutters to reciprocate the latter toward and from the line of intersection of said planes during the reciprocation of said carrier.

5. In a carving-machine, the combination of a frame, a carrier reciprocatably mounted upon said frame, a plurality of cutters mounted on said carrier and reciprocatable thereon in intersecting planes toward and from the line of intersection o said planes, said planes being parallel to the line of reciprocation of said carrier, and a stock-guide parallel to the line of intersection of said planes and supported upon and overhanging said carrier and embracing within its angle said line of intersection.

6. In a carving-machine, a carrier provided with a transverse guideway, an opening through said carrier, and a guideway in the walls of said opening intersecting the plane of said transverse guideway.

7. In a carving-machine, an apertured carrier, a guideway disposed on said carrier and a guideway disposed in the aperture in said carrier, said guideways lying in intersecting planes.

8. In a carving-machine, the combination of a carrier having an aperture therethrough, a guideway in the walls of said aperture, a guideway on said carrier lying in a plane intersecting that of said guideway in said aperture, and a plurality of cutters respectively mounted to reciprocate in each of said several guideways.

9. In a carving-machine, the combination with a power-driven device and a feed for feeding stock continuously and operated by said power-driven device, of a carrier reciprocatable parallelly of the continuously-fed stock, an operative driving connection between said carrier and power-driven device for imparting a reciprocating movement to said carrier which in the direction of the movement of said stock corresponds with the movement of said stock, a plurality of cutters carried by said carrier and reciprocatable angularly of said stock and one another and positive driving connections intermediate said power-driven device and said cutters adapted, arranged and timed to reciprocate said cutters to incise said stock during the movement of said carrier in the direction of the movement of said stock.

10. In a carving-machine, the combination with a power-driven device and a feed for feeding stock continuously and operated by said power-driven device, of a carrier reciprocatable parallelly of the continuously-fed stock, a cam including driving connection between said carrier and power-driven device for imparting a reciprocating movement to said carrier which in the direction of movement of said stock corresponds with the movement of said stock, a plurality of cutters carried by said carrier and reciprocatable angularly of said stock and one another, and positive driving connections intermediate said power-driven device and said cutters adapted, arranged and timed to reciprocate said cutters to incise said stock during the movement of said carrier in the direction of the movement of said stock.

11. In a carving-machine, the combination with a power-driven device and a feed for feeding stock continuously and operated by said power-driven device, of a carrier reciprocatable parallelly of the continuously-fed stock, an operative driving connection between said carrier and power-driven device for imparting a reciprocating movement to said carrier which in the direction of the movement of said stock corresponds with the movement of said stock, a plurality of cutters carried by said cutter and reciprocatable angularly of said stock and one another and laterally flexible, positive driving connections intermediate said power-driven device and said cutters adapted, arranged and timed to reciprocate said cutters to incise said stock during the movement of said carrier in the direction of the movement of said stock.

12. In a carving-machine, the combination with a power-driven device and a feed for feeding stock continuously and operated by said power-driven device, of a carrier reciprocatable parallelly of the continuously-fed stock, a cam including driving connection between said carrier and power-driven device for imparting a reciprocating movement to said carrier which in the direction of movement of said stock corresponds with the movement of said stock, a plurality of cutters carried by said carrier and reciprocatable angularly of said stock and one another and laterally flexible, positive driving connections intermediate said power-driven device and said cutters to incise said stock during the movement of said carrier in the direction of the movement of said stock.

13. In a carving-machine, the combination with a power-driven device and a feed for feeding stock continuously and operated by said power-driven device of a carrier reciprocatable parallelly of said continuously-fed stock, a plurality of tools carried by said carrier, an oscillating member operatively connected with said carrier to reciprocate the same and a cam-faced actuator operated by said power-driven device for actuating said oscillating member to reciprocate said carrier and designed to impart a movement to said carrier in the direction of movement of the stock corresponding to the concurrent movement of said stock and means for moving said tools in different directions to incise the stock.

14. In a carving-machine, the combination with a power-driven device and a feed for feeding stock continuously and operated by said power-driven device, of a cutting-tool carrier reciprocatable parallelly of said continuously-moving stock, a cutter reciprocatably mounted on said carrier and a driving connection between said power-driven device and said cutter including a laterally-movable link for reciprocating said cutter to incise said stock during the movement of said carrier in the direction of the movement of said stock.

15. In a carving-machine, the combination of a stock-feed for feeding stock continuously, a carrier reciprocatable parallelly of said continuously-moving stock, cutters mounted on said carrier, and reciprocatable in different directions to engage said stock, a power-driven device and operative connections between said stock-feed, carrier, cutter and power-driven device, adapted, arranged and timed to continuously feed said stock, reciprocate said carrier with a movement in the direction of movement of said stock corresponding to the concurrent movement of said stock and reciprocate said cutter to engage said stock during the movement of said carrier in the direction of the movement of said stock.

16. In a carving-machine, the combination of a stock-feed roll, a power-driven device geared with and to drive said feed-roll to continuously feed stock, a carrier reciprocatable substantially parallelly of said continuously-fed stock, a cam and oscillating-arm connection between said carrier and power-driven device for reciprocating said carrier with a movement in the direction of the movement of said stock corresponding to the concurrent movement of said stock, a cutter mounted upon said carrier reciprocatable to engage said stock, and a crank and oscillating-arm driving connection from said power-driven device adapted to reciprocate said cutter through a laterally-movable link to engage said stock during the movement of said carrier in the direction of movement of said stock.

17. In a carving-machine, the combination of a reciprocatable carrier and a plurality of cutters mounted on said carrier and simultaneously reciprocatable thereon in intersecting planes, toward and from separate points on the line of intersection of said planes, said planes being parallel to the line of reciprocation of said carrier.

18. In a carving-machine, the combination of a carrier, means for reciprocating said carrier with a uniform movement in one direction, and cutters carried by said carrier and mounted to operate upon the stock in different directions.

19. A carving-machine comprising stock guiding and feeding means, cutting members mounted to operate upon the stock in different directions, a slide whereon said cutting members are mounted, and means for moving said slide to and fro in the direction of the stock-feeding movement.

20. A carving-machine comprising stock guiding and feeding means, a slide, means for moving said slide to and fro in the direction of the feeding movement, and independent sliding tool-carriages mounted upon said slide.

21. A carving-machine comprising stock guiding and feeding means, a slide, means for moving said slide to and fro in the direction of the feeding movement, and independent sliding tool-carriages so mounted upon said slide that the tools carried thereby may incise the stock in different directions.

22. A carving-machine comprising stock guiding and feeding means, a slide, means for moving said slide to and fro in the direction of the feeding movement, cutting members mounted upon said slide for incising the stock in different directions, and a reciprocating member mounted upon the framework and positively connected to said cutting members for operating them to incise the stock.

23. A carving-machine comprising stock guiding and feeding means, a slide, means for moving said slide to and fro in the direction of the feeding movement, cutting members mounted upon said slide for incising the stock in different directions, a rock-arm upon the framework, a link connecting said rock-arm to one of said cutting members, and means for enabling said rock-arm to reciprocate the other of said cutting members.

24. A carving-machine comprising stock guiding and feeding means, a slide, means for moving said slide to and fro in the direction of the feeding movement, cutting members mounted upon said slide for incising the stock in different directions, a rocking member upon the framework, a link connecting said rocking member to one of said cutting members, and a link connecting said rocking member to the other of said cutting members.

25. A carving-machine comprising stock guiding and feeding means, a slide, cutting members mounted upon said slide for incising the stock in different directions, a reciprocating member for moving said cutting members toward and away from the stock, said cutting member and said reciprocating member being positively connected, and means for moving said slide to and fro along the stock so that during the cutting operation the movement of the slide coincides with the stock-feeding movement.

26. A carving-machine comprising a stock, guide, uniformly-acting stock-feeding means, a plurality of cutting members, means for causing the cutting members to incise the stock in different directions, and means embodying a rocking member for reciprocating the cutters along the stock so that during the incising operation they move coincidently with the stock.

27. A carving-machine comprising stock guiding and feeding means, a slide, means for moving said slide to and fro along the stock, cutting members mounted upon said slide so as to incise the stock in different directions, and reciprocating means upon the framework positively connected to said cutting member for reciprocating them transversely of the stock, said cutters being mounted to incise the stock at intervals such that one cutter may supplement the cut previously made in the stock by the other.

28. A carving-machine comprising stock guiding and feeding means, a slide, means for moving said slide to and fro along the stock, cutting members mounted upon said slide for incising the stock in different directions, a rocking member mounted upon the framework, and a link extending from said rocking member to each of said cutting members.

29. A carving-machine comprising stock guiding and feeding means, cutting members mounted to incise the stock in different directions and at separate points such that one cutter supplements the incision previously made by the other cutter, a slide whereon said cutting members are mounted, means for moving said slide to and fro in the direction of the stock-feeding movement, and means for causing said cutters to incise the stock simultaneously.

30. A carving-machine comprising stock guiding and feeding means, a slide, means for moving said slide to and fro in the direction of the feeding movement, independent sliding tool-carriages so mounted upon said slide that the tools carried thereby may incise the stock in different directions and at separate points such that one cutter supplements the incision previously made by the other cutter.

31. A carving-machine comprising stock guiding and feeding means, a slide, means for moving said slide to and fro in the direction of the feeding movement, cutting members mounted upon said slide for incising the stock in different directions and at separate points such that one cutter supplements the incision previously made by the other cutter, and a reciprocating member upon the framework positively connected to said cutting members for operating them simultaneously.

32. A carving-machine comprising stock guiding and feeding means, a slide, cutting members mounted upon said slide for incising the stock in different directions and at separate points such that one cutter supplements the incision previously made by the other cutter, a reciprocating member for moving said cutting members simultaneously toward and away from the stock, said cutting member and said reciprocating member being positively connected, and means for moving said slide to and fro along the stock so that during the cutting operation the movement of the slide coincides with the stock-feeding movement.

33. A carving-machine comprising a stock guide, uniformly-acting stock-feeding means, a plurality of cutting members, a slide for carrying said cutting members, means for shifting said cutting members on the said slide for causing the cutting members to incise the stock simultaneously from different directions and at separate points such that one cutter supplements the incision previously made by the other cutter, and means for reciprocating the said slide along the stock so that during the cutting operation the cutters move coincidently with the stock.

34. A carving-machine comprising means for feeding and guiding the stock, a slide, means to move said slide to and fro along the stock, cutters mounted upon said slide, and adapted to incise the stock in different directions, a rocking member and a link extending from said rocking member to each of said cutters.

35. A carving-machine comprising stock guiding and feeding means, a slide and means for reciprocating the same in the line of the feed, cutting mechanisms mounted on said slide and operative upon the stock in different directions transversely of the line of feed.

36. A carving-machine comprising stock guiding and feeding means, a slide, means for reciprocating said slide in the line of the feed movement, and a number of tool-carriages mounted thereon and reciprocable in different transverse directions.

37. A carving-machine comprising stock guiding and feeding means, a slide, means for moving said slide to and fro in the line of the feeding movement, and independent sliding tool-carriages mounted upon said slide.

FRANCIS H. RICHARDS.

Witnesses:
FRED. J. DOLE,
JOHN O. SEIFERT.